UNITED STATES PATENT OFFICE.

RAYMOND CAHUC, OF TOULOUSE, FRANCE.

IMPROVEMENT IN EXPLOSIVE COMPOUNDS.

Specification forming part of Letters Patent No. 161,325, dated March 30, 1875; reissue No. 6,601, dated August 17, 1875; application filed June 26, 1875.

*To all whom it may concern:*

Be it known that I, RAYMOND CAHUC, of Toulouse, in the Department of the Haute-Garonne, Republic of France, have invented a new and useful Improvement in Mining-Powders, of which the following is a specification:

The object of my invention is to furnish for mining purposes blasting-powder whose manufacture, storage, or use may be accomplished without the least danger of accident, and which produces a dynamical effect superior to the common mining-powders, and equal to common dynamite, while it combines the advantages of cheapness and non-explosibility in the open air with a reduced production of smoke and injurious gases in its explosion, leaving hardly any trace or residue of solid deposit or ashes in the bore-hole.

The invention consists, mainly, in the production of a mining-powder of nitrate of potash or equivalent salts, sulphur, and soot or lamp-black, with tanner's bark, sawdust, or similar separating ingredients, ground and mixed in suitable proportions, with a solution of sulphate of iron in water, to be boiled and treated therewith under a certain temperature until the powder is obtained.

In manufacturing the powder the ingredients are employed in the following proportions: Nitrate of potash, of soda, or of lime, from forty-eight to seventy parts; sulphur, from eight to sixteen parts; soot or lamp-black, from one to nine parts; and, lastly, in proportion to the nitrate, sulphur, and carbon employed, a corresponding quantity of tanner's bark or sawdust, used either separately or in mixture, for rendering the treatment of the explosive ingredients, and, finally, the powder produced, entirely without danger of explosion until applied in proper manner.

The ingredients are ground to suitable fineness, and then placed in a boiler of larger size than would be required for the purpose of just holding the ground parts. The ingredients are mixed and thoroughly stirred in the boiler, and moistened by a solution of sulphate of iron in water, for the purpose of purifying the different ingredients, the proportion of sulphate of iron being from five to six parts in one hundred parts of water. The ingredients are then exposed for a suitable length of time in the boiler to the action of heat at a temperature of from 120° to 130° of Celsius, (240° to 260° Fahrenheit,) until the mass becomes entirely liquid, with the parts so combined as to form a uniform black paste. The boiler is then removed from the fire and the contents allowed to cool off, to be then dried at a high temperature. The compound forms then a powder of greater or less degree of fineness, according to the proportions and condition of the materials used, of a blackish color, and a density of about 0.600. It may be stored for considerable length of time without undergoing the least alteration or deterioration.

The sulphate-of-iron solution is employed to purify the impure carbons employed, and produce the inexplosibility of the ingredients in the open air, which gives greater safety of its use.

In the atmospheric air the powder takes fire and burns like any other inflammable body brought in contact with an ignited body or a flame of sufficient intensity, producing no shock or explosion whatever. Neither atmospheric electricity nor shocks of any kind have any action on the powder, which explodes only when firmly tamped or compressed in the bore-hole, to be ignited like the ordinary mining-powder by means of a mining-fuse.

The quantity and nature of the gases developed on ignition in compressed state produce a dynamical effect of large power, nearly equal to dynamite, and without the dangerous properties of the same.

As the powder may be ignited with difficulty in the air, and as it does not detonate without being compressed, it may be stored in all inhabited places with perfect safety.

Having thus described my invention, I claim as new and desire to secure by Letters Patent—

1. A mining-powder composed of nitrate of potash, sulphur, lamp-black, and tanning-bark or sawdust, and sulphate of iron, substantially in the manner and in the proportions set forth.

2. The process of forming a compound for mining purposes which shall be incombustible at low temperature, and non-explosive except when under pressure, by first heating nitrate of potash, carbon, and sulphur, in the presence of sawdust and a solution of sulphate of iron, till a homogeneous liquid mass is produced, then cooling and drying the same, as described.

RAYMOND CAHUC.

Witnesses:
T. B. MOSHER,
ALEX. F. ROBERTS.